V. WIRICK.
Car-Starters.
No. 145,076.  Patented Dec. 2, 1873.
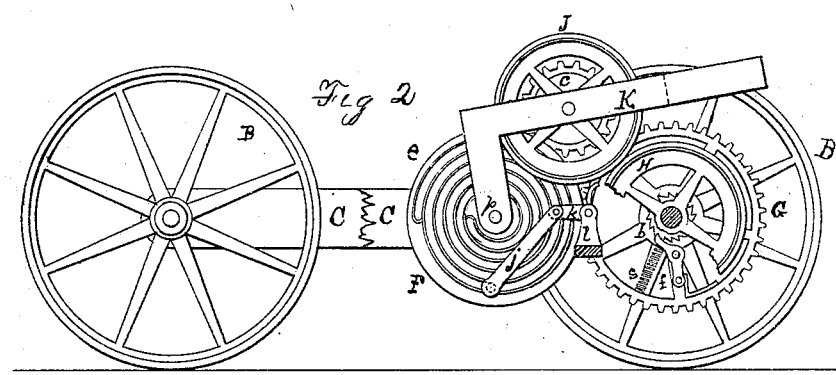
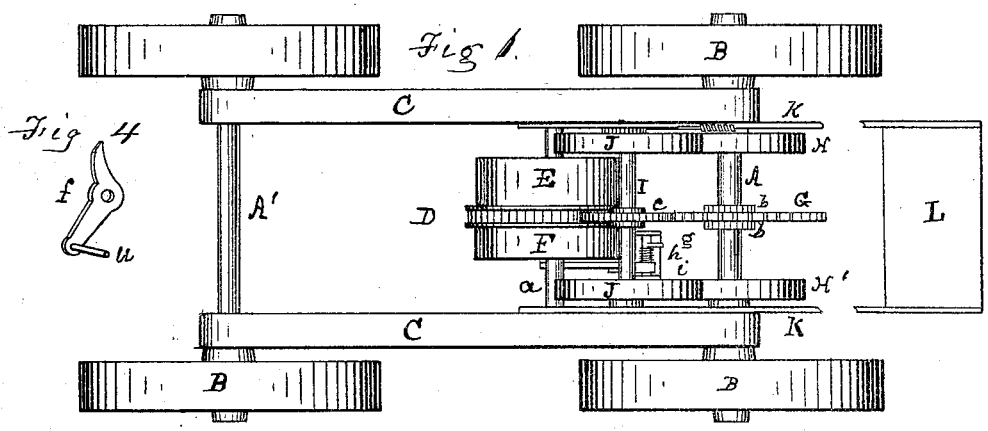
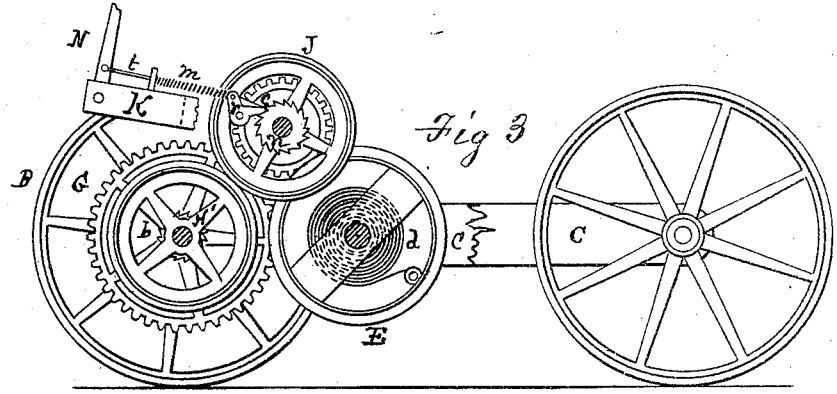
Witnesses
E. A. West
O. W. Bond
Valentine Wirick
Inventor.

UNITED STATES PATENT OFFICE.

VALENTINE WIRICK, OF CHICAGO, ILLINOIS.

IMPROVEMENT IN CAR-STARTERS.

Specification forming part of Letters Patent No. 145,076, dated December 2, 1873; application filed June 23, 1873.

*To all whom it may concern:*

Be it known that I, VALENTINE WIRICK, of the city of Chicago, in the county of Cook and State of Illinois, have invented new and useful Improvements in Car-Starters, of which the following is a full description, reference being had to the accompanying drawings, in which—

Figure 1 is a plan view; Figs. 2 and 3, elevations, showing opposite sides; and Fig. 4, a detail.

The object of my invention is to treasure up a portion of the power which is usually lost in stopping a car, and to utilize the same in starting the same.

In the drawings, A A' represent the axles, B the wheels, and C bars secured to the axles, of a street-car. $a$ is a rod or shaft, the ends of which are secured to the bars C; D, a cog-wheel placed loosely upon $a$, to which wheel D are secured two drums, E F, one on each side. Within E is a coil-spring, $d$, one end secured to the axle, and the other to the drum. Within F is a spiral channel, $e$, closed at both ends. G is a cog-wheel placed loosely upon the axle A, and so arranged as to engage with D; $b\ b$, ratchet-wheels permanently secured to the axle A upon each side of the wheel G; $f$, pawls engaging with the ratchet-wheels $b\ b$. I use two pawls, fastened one upon each end of a pin passing through one of the arms of the wheel G. One of these pawls has an arm extending out from it, upon the outer end of which is a small crank-pin, $u$. (See Fig. 4.) $s$ is a spring to hold the pawls $f$ in place. These ratchet-wheels $b\ b$ and pawls $f$ are so arranged that the axle can revolve freely when the car is moving in a forward direction, but will not revolve in the other direction while the pawls are engaged with the ratchet-wheels; and the ratchet-wheels $b\ b$ being permanently secured to the axle, and the pawls being connected to the wheel G, when the wheel G is acted upon by the spring $d$ through the wheel D, the tendency is to rotate the axle in a forward direction. H H' are friction-wheels permanently secured to the axle A; K, arms, the inner ends of which, $p$, are pivoted to the bars C C; L, cross-piece between the outer ends of the arms K; I, shaft revolving in bearings in the arms K; $c$, cog-wheel permanently secured to the shaft I, and arranged to engage with the cog-wheel D; J J, friction-wheels, permanently secured to the shaft I. $g$ is a small shaft, placed in bearings supported in any convenient manner; $h$, an arm projecting from, and permanently secured to, the shaft $g$; $i$, coil-spring to return the shaft $g$ to its proper position. To the same shaft $g$ is permanently connected a small arm, $k$, to the outer end of which is pivoted a bar or arm, $j$, to the outer end of which is secured a pin, so arranged as to project into the spiral groove $e$. On one end of the shaft I, and permanently secured thereto, is a ratchet-wheel, $n$, and $r$ is a pawl engaging with this wheel $n$, which pawl is operated by means of the lever N and rod $t$. $m$ is a spring to hold the pawl in place, except when withdrawn by the lever.

The car can be stopped by pressing upon the cross-piece L, bringing the friction-wheels J J in contact with the friction-wheels H H'. While so in contact the wheels J J and cog-wheel $c$, all on the shaft I, will revolve, and $c$, engaging with the wheel D, will wind up the coil-spring $d$ in the drum E. This spring $d$ will be held in this position by means of the ratchet $n$ and pawl $r$; but if the pawl $r$ be withdrawn from the ratchet $n$ by means of the lever N and rod $t$, the action of the spring $d$, through the cog-wheel D upon the cog-wheel G, will aid in starting the car, the power being communicated to the axle through the pawls $f$ and ratchet-wheels $b$.

In order to make this device a success, provision should be made for moving the car in either direction, backward as well as forward. As before stated, when the pawls $f$ are engaged with the wheels $b$, the axle A can only revolve in one direction; but when these pawls are disengaged from the wheels the axle can revolve in the other direction, and this is accomplished as follows: The spiral channel $e$, shaft $g$, arms $j\ k$, and pawls $f$, with the crank-pin $u$ at the end thereof, are all so constructed and arranged relatively to each other that, when the pin in the outer end of the arm $j$ comes to the inner end of the spiral channel $e$, the crank-pin $u$ will come in contact with the arm $h$ on the shaft $g$, which shaft being partially rotated by the levers $j\ k$, the pawls $f$ will be disengaged from the ratchet-wheels $b$, when the axle will be free to revolve backward. The parts will be brought into the proper position for accomplishing this result whenever the spring $d$ is nearly uncoiled, which will take place whenever the driver sees fit to release the pawl $r$ from the wheel $n$ a sufficient length of time.

In winding the spring $d$, when the pin in the outer end of the arm $j$ comes in contact with the outer end of the spiral channel $e$ the drums E F can no longer revolve. This arrangement will prevent an undue winding of the spring $d$. When in this position, if the friction-wheels J J be brought in contact with the friction-wheels H H', they will operate as simple brakes.

A suitable place is to be provided for the driver, which is not represented in the drawings, so arranged that he can operate the parts by means of his feet pressing upon the cross-piece L.

Only one ratchet-wheel, $b$, and pawl, $f$, are essential.

I do not limit myself to the use of this device upon street-cars.

What I claim as new is as follows:

1. The combination of the arms K, friction-wheels J H, cog-wheels D $c$ G, spring $d$, ratchet-wheel $b$, pawl $f$, ratchet-wheel $n$, and pawl $r$, all constructed and arranged substantially as and for the purposes specified.

2. The combination of the arm K, friction-wheels J H, cog-wheels D $c$ G, ratchet-wheels $b$ $n$, ratchets $f$ $r$, rod $t$, lever N, spiral channel $e$, shaft $g$, arm $h$, and arms or levers $j$ $k$, all constructed to operate substantially as and for the purposes specified.

VALENTINE WIRICK.

Witnesses:
    E. A. WEST,
    O. W. BOND.